United States Patent
Mann

(10) Patent No.: US 8,905,199 B2
(45) Date of Patent: Dec. 9, 2014

(54) CONTROL SYSTEM FOR DOWNHILL SKIS

(71) Applicant: Samuel J. Mann, Englewood, NJ (US)

(72) Inventor: Samuel J. Mann, Englewood, NJ (US)

(*) Notice: Subject to any disclaimer, the term of this patent is extended or adjusted under 35 U.S.C. 154(b) by 171 days.

(21) Appl. No.: 13/682,314

(22) Filed: Nov. 20, 2012

(65) Prior Publication Data

US 2013/0341127 A1    Dec. 26, 2013

Related U.S. Application Data

(60) Provisional application No. 61/661,906, filed on Jun. 20, 2012.

(51) Int. Cl.
*B60T 1/14* (2006.01)
*A63C 7/10* (2006.01)

(52) U.S. Cl.
CPC ........... *A63C 7/1086* (2013.01); *A63C 2203/22* (2013.01)
USPC .................................... 188/6; 188/8; 280/605

(58) Field of Classification Search
USPC ........ 188/6, 8, 128; 280/604, 605, 11.213, 18
See application file for complete search history.

(56) References Cited

U.S. PATENT DOCUMENTS

| | | | |
|---|---|---|---|
| 2,213,754 A | | 9/1940 | Thirring |
| 3,580,605 A | | 5/1971 | Spitler |
| 3,704,024 A | * | 11/1972 | Martin ........................... 280/605 |
| 3,899,185 A | * | 8/1975 | Martin ........................... 280/605 |
| 4,063,751 A | * | 12/1977 | Salomon ........................ 280/605 |
| 4,066,276 A | * | 1/1978 | Salomon ........................ 280/605 |
| 4,109,931 A | | 8/1978 | Woitschatzke et al. |
| 4,152,007 A | | 5/1979 | Smith |
| 4,154,458 A | * | 5/1979 | Wehrli ........................... 280/605 |
| 4,219,214 A | | 8/1980 | Kostov |
| 4,342,468 A | * | 8/1982 | Beyl .............................. 280/605 |
| 4,531,763 A | | 7/1985 | Toland |

(Continued)

FOREIGN PATENT DOCUMENTS

| | | | |
|---|---|---|---|
| DE | 3309295 A1 | * | 9/1984 |
| DE | 3433504 A1 | | 3/1986 |
| FR | 2545367 A1 | | 11/1984 |

OTHER PUBLICATIONS

International Search Report and Written Opinion of the International Searching Authority Application No. PCT/US2013/070960 Completed: Mar. 20, 2014; Mailing Date: Apr. 14, 2014 7 pages.

*Primary Examiner* — Thomas J Williams
*Assistant Examiner* — Mariano Sy
(74) *Attorney, Agent, or Firm* — St. Onge Steward Johnston & Reens LLC

(57) ABSTRACT

A control system for downhill skis enables effective, continuous control of ski-to-surface resistance, to accommodate changing steepness and other conditions during a downhill ski run. Controllably positionable brake elements are mounted on the skis, centrally between the side edges thereof. Positioning motors are mounted on each ski and are operable to controllably project or retract the brake elements relative to the ski bottoms, continuously or in finite increments, allowing the skier to maintain a safe and comfortable skiing experience over almost any ski slope under a wide variety of ski conditions. The braking elements, preferably blade-like and oriented at right angles to the ski axis, are positioned close to the skier's feet, allowing the skis to be easily controlled in turns and other maneuvers. A spring-loaded, hinged mounting arrangement allows the mechanisms to momentarily pivot to retracted positions whenever the braking elements engage a rock or other immovable object.

27 Claims, 11 Drawing Sheets

(56) References Cited

U.S. PATENT DOCUMENTS

| | | |
|---|---|---|
| 4,676,521 A | 6/1987 | Monreal |
| 4,795,183 A | 1/1989 | Reuters |
| 4,911,461 A | 3/1990 | Humphrey |
| 4,986,561 A | 1/1991 | Humphrey |
| 5,145,200 A | 9/1992 | Humphrey |
| 5,509,683 A | 4/1996 | Daniel |
| 5,673,772 A * | 10/1997 | Martin ............................ 188/6 |
| 5,735,063 A * | 4/1998 | Mc Manus ...................... 36/124 |
| 6,241,265 B1 | 6/2001 | Kovar et al. |
| 6,308,966 B1 * | 10/2001 | Cook et al. ................. 280/28.11 |
| 6,971,483 B2 | 12/2005 | Houston |
| 2009/0200772 A1* | 8/2009 | Rassman et al. .............. 280/605 |
| 2010/0045000 A1 | 2/2010 | Wasserman |
| 2012/0297646 A1* | 11/2012 | Brault ............................ 36/124 |

* cited by examiner

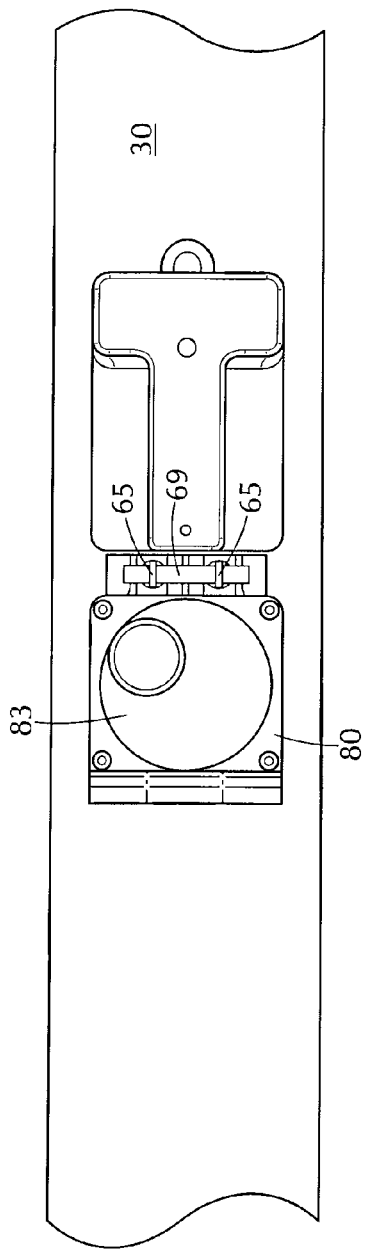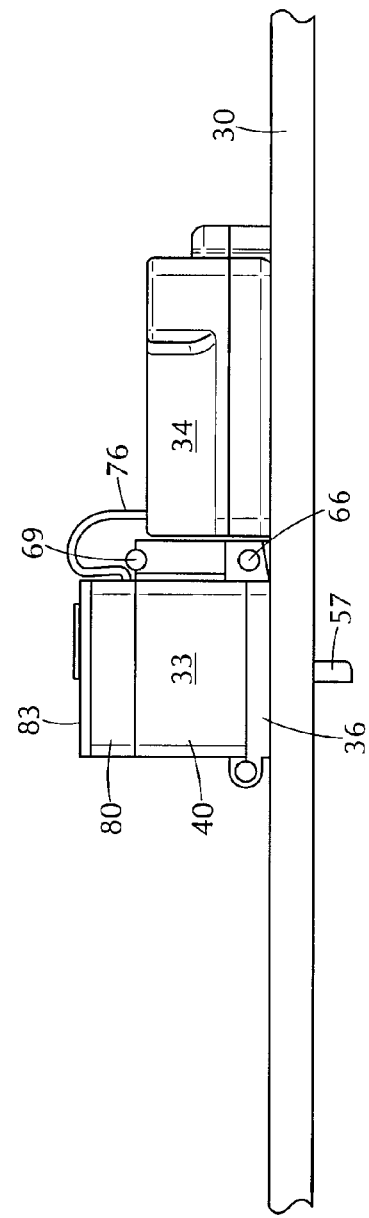

CONTROL SYSTEM FOR DOWNHILL SKIS

FIELD OF THE INVENTION

This invention relates to speed control arrangements for downhill skis, to enable downhill skiers to better control their speed of descent. In principle, and invention is also applicable to other snow recreational devices that slide over a snow surface, such as snow boards, toboggans and the like.

BACKGROUND OF THE INVENTION

In downhill skiing, speed of descent can be controlled in a variety of ways, depending upon factors such as steepness of the slope, snow conditions, irregularities in the terrain, skill and strength of the skier, etc. A skilled skier can check speed by executing a series of turns in relatively rapid succession while maintaining a generally downward trajectory. A less skilled person may tend to ski laterally back and forth across the slope, minimizing the vertical component of the path and executing less frequent turns. Regardless of the level of skill of the skier, however, the condition of a particular area of terrain, unsatisfactory weather conditions, reduced visibility toward the end of the day and/or fatigue can make it difficult at times for a skier to maintain speed at a safe and comfortable level and/or to respond to an emergency condition or obstacle.

It has been proposed heretofore to provide downhill skis with devices for projecting one or more elements into the snow surface over which the skis are moving, in order to add resistance and reduce the speed of the skis. In the Smith U.S. Pat. No. 4,152,007, for example, brake elements are pivotally mounted at the trailing ends of the skis and are actuated by hydraulic cylinders mounted on the skis. A hand-operated hydraulic pump is mounted on a ski pole and can be operated by the skier who desires to reduce speed. The brake elements are pivoted downward by their respective cylinders and dig into the snow behind the skis to introduce resistance and reduce the speed of the skis. The Daniel U.S. Pat. No. 5,509,683 also has brake elements pivoted at the trailing ends of the skis. The brake elements of Daniel are actuated by electric motors driving linear screw shafts in much the same manner as the hydraulic cylinders of the above-mentioned Smith patent. The Rassman U.S. Publication 2009/0200772 discloses a device with pivoted braking elements, mounted either at the trailing ends of the skis or, if forward of the trailing ends, in straddling relation to the individual skis. In one embodiment of the Rassman device, the braking elements are actuated by a flexible cable connected to grips on the ski poles and operated somewhat in the manner of standard bicycle brakes. In another embodiment, the cables are operated by electric motors on the individual skis, operated by a wireless control carried by the skier.

The known devices have several significant shortcomings. For example, devices that are attached to the trailing ends of the skis can change the desired balance of the skis by adding extra weight at the trailing end extremities. Moreover, when the trailing end devices are actuated, they can make steering of the skis difficult by tending to hold the ski tails on a pre-existing path instead of allowing them to freely move laterally to enable the skier to change the direction of the skis. When seeking to reduce speed or to stop, the ability to change the direction of the skis relative to the fall line of the hill can be very important.

In some embodiments of the Rassman et al publication, while the braking elements are mounted forward of the ski tails, a pair of braking elements is arranged to straddle each of the skis. This increases the likelihood of the two skis becoming engaged during skiing to interfere with the skier's control and also provides exposed sharp edges that could result in injury in a fall.

SUMMARY OF THE INVENTION

The present invention relates to a new and improved control system which provides a downhill skier with a high level of control against excessive speeds, enabling the skier to impose and release variable levels of speed control as he or she descends over different types of terrain on the ski slope. The skier is thus enabled to "downshift" appropriately when starting into a steep or otherwise difficult section of the hill, in order to keep speed at a comfortable level in relation to the skill level of the skier and/or such factors as snow conditions, fatigue, visibility, etc., and to resume greater or full speed as conditions permit. Thus, in a typical descent, a skier may engage and release speed control on a repetitive basis as he or she encounters and traverses areas of increasing and moderating difficulty, enabling the skier to ski under full control at all times. The procedure is not unlike touching and releasing the brakes of an automobile to maintain speed under proper control for the driving conditions.

In accordance with one aspect of the invention, the control system includes a controllably projectable and retractable braking element which extends downward through each ski, between the side edges thereof, and can be projected variable distances from the bottom of the ski, as necessary or desirable in order to control the level of resistance of the ski to movement over the snow surface. A controllable positioning motor is mounted on top of each ski, directly above the braking element. Preferably the braking element is located as close as practicable to the heel of the ski binding. Normally, the braking elements are maintained in fully retracted positions, with their lower end surfaces substantially flush with the bottom surfaces of the skis. In their retracted positions, the braking elements have no significant effect on the slideability of the skis, and the skier can ski as fast as he or she feels comfortable and under control. When the skier feels a need or desire for some speed-controlling resistance, the positioning motors are actuated to project the braking elements downward, below the bottom surfaces of the skis. The braking elements can be projected incrementally, under the control of the skier, until a comfortable speed level is established. With experience, a skier is able to make an anticipatory "downshifting" adjustment upon starting into a steep, icy or otherwise difficult section of the ski slope, and thus can proactively avoid even short periods of excessive speed for the conditions.

In an advantageous embodiment of the invention, the control system includes provisions for a plurality of finite positions of increasing projection of the braking elements below the bottom surfaces of the skis, such that the skier can add resistance incrementally, either to reduce current speed or in anticipation of conditions that might otherwise result in excessive speed for the circumstances. This allows the skier to enjoy a more satisfying skiing experience, with the ability to ski up to the maximum level that personal skills and slope conditions permit, without fear of losing control if the skier is confronted with something unexpected. The invention also enables a skier to maintain his or her skis oriented more toward the fall line of the hill while maintaining speed and control, providing a more enjoyable skiing experience and perhaps also contributing to the skiers overall skiing skills.

To advantage, the braking elements of the new device are mounted at a position spaced well forward of the trailing ends of the skis and preferably as close as practicable to the feet of the skier. The surface engaging elements are thus positioned close to a center of downward force derived from the weight of the skier and also in an area where the snow has been compacted by the weight of the skier on the moving skis, providing increased resistance to a projected braking blade. This is also a region of maximum strength of the skis, allowing the skis to be provided with through openings to receive the braking elements and their supporting structure. The arrangement of the invention also enables the necessary mechanisms to be located entirely between the edges of the skis, such that the braking elements are a minimal impediment to the ability of the skier to make turns and otherwise maneuver in a normal manner, maintaining the skis in a closely spaced, parallel arrangement.

In a particularly preferred form of the invention, the braking elements are relatively flat, stiff blades, which are disposed transversely to the principal axis of the ski. When the blades are projected incrementally from the bottom of the ski, they present relatively broad surfaces to the snow, to impart resistance to forward movement, while presenting minimal surface area laterally, to minimize resistance to lateral movements of the skis. Minimizing lateral resistance is of particular significance as it minimizes interference with the ability of the skier to make turns as necessary or desirable, even while the braking elements are projected for braking effect.

In a preferred embodiment of the invention, each of the braking element blades is operably connected to a positioning motor mounted on the upper surface of the ski. A threaded connection between the positioning motor and the braking element enables the braking element to be controllably projected and retracted in accordance with rotations of its positioning motor. Advantageously, the positioning motors are stepper motor linear actuators whose rotations can be precisely incrementally controlled by the skier during continued skiing.

Because skiers can accidentally run their skis over relatively non-movable objects, such as rocks, tree roots and the like it is desirable to provide shock relief for occasions in which the skier encounters such non-movable objects while the surface-engaging elements are in partially or fully projected positions. To this end, in a particularly preferred embodiment of the invention the positioning motors and blades are pivotally mounted on the skis and spring-urged into their normal operating positions in which the blades are oriented for desired braking effect when projected downward from the ski. However, should a projected blade engage a rock, root or other immovable object, the motor and blade can pivot upwardly momentarily to allow the blade to pass over the object without damaging the mechanism or causing the skier to fall.

Normally, the positioning motors are driven by associated battery sources housed on each ski. Desirably, the batteries are rechargeable, with the capacity to easily handle a full day of skiing and be recharged overnight. However, should the skier be confronted with exhausted batteries during the course of the skiing day, provisions are made for easy manual operation of the braking elements, if necessary, to enable a skier to continue skiing.

In one preferred embodiment of the invention a wireless control sender is provided in one ski pole and includes a manually engageable, trigger type control element. Each of the positioning motors is associated with a wireless receiver which receives signals from the sender unit and responds accordingly, instantaneously and synchronously, to re-position the braking element as directed by the sender. Advantageous circuit arrangements are provided, by which each actuation by the skier for added resistance results in a predetermined incremental projection of the braking elements. Retraction of the braking elements can also be controlled incrementally. However, preferentially, the skier can press and hold the sender control for a short interval (e.g., 2 seconds) to first fully retract the braking elements and thereafter re-set them, if indicated, for a desired level of speed control.

An additional and rather significant advantage of the new system is that, when it is necessary for the skier to walk up an incline without removing the skis, the braking elements may be projected below the ski bottoms, to provide traction for ascending the incline. Normally, in order to walk upward on an incline, a skier must either use an awkward herringbone walking procedure, in which the skis are splayed outwardly at a sufficient angle to minimize the tendency for the skis to slide back down the hill. Alternatively (and/or in addition), substantial backward pressure can be applied to the ski poles to minimize or prevent backsliding. The skier can also turn both skis sideways to the hill and sidestep up the incline. Any of the foregoing procedures are awkward and slow, and require considerable strength and energy. Moreover, skiers sometimes will fall, occasionally resulting in a release of the ski binding which necessitates an awkward and sometimes difficult reengagement of the ski binding on a sloping surface. With the system of the invention, by projecting the braking blades below the ski bottoms, a skier can simply walk the skis directly up the incline, allowing the blades to dig into the snow with each step to prevent one ski from sliding backward while the other is being advanced by the skier.

For a more complete understanding of the above and other features and advantages of the invention, reference should be made to the following detailed description of a preferred embodiment thereof and to the accompanying drawings.

BRIEF DESCRIPTION OF THE DRAWINGS

FIG. 2 is a top plan view of the ski brake system of FIG. 1.

FIG. 3 is a side elevational view of the ski brake system of FIG. 1, showing the braking element in an extended position.

DETAILED DESCRIPTION OF THE INVENTION

Figure 6:
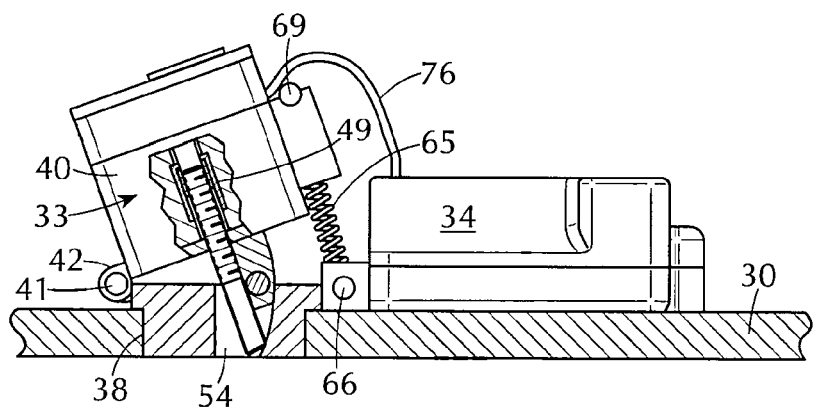
FIG. 6 is a view similar to FIG. 4, but partially in cross-section and showing the brake mechanism in a tilted orientation.
Figure 8:
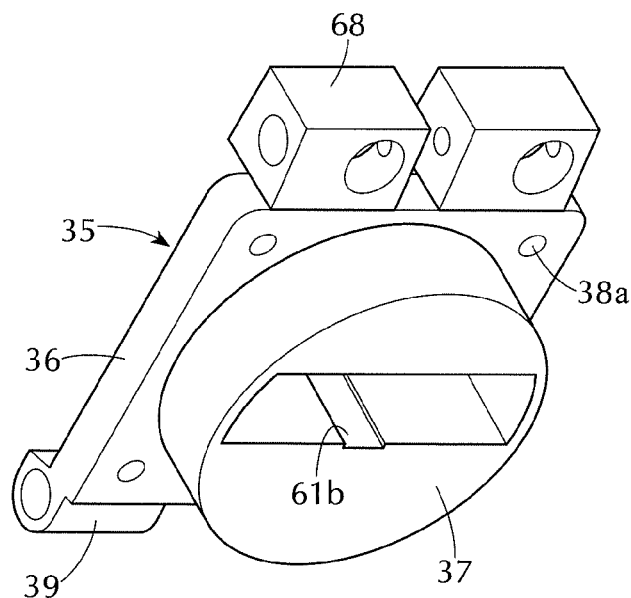
FIG. 8 is an orthographic view, from below, of the base member shown in FIG. 7.
Figure 9:
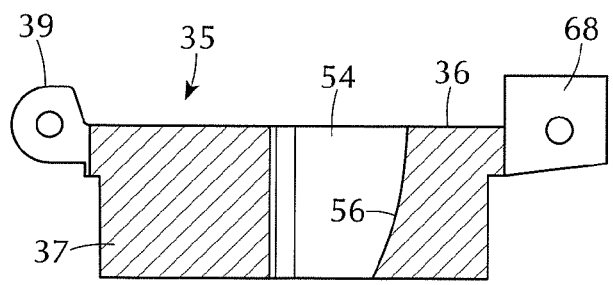
FIG. 9 is a longitudinal cross-sectional view along a centerline of the base member of FIG. 7.

Referring to the drawings, the reference numeral 30 designates a typical ski on which is mounted a boot binding, indicated schematically at 31. Closely adjacent to and behind the boot binding 31 is the braking system of the invention, designated generally by the reference numeral 32. The braking system 32 comprises a motor unit 33 and a battery box 34, which also houses electronic controls for the motor unit 33. The motor unit 33 comprises a base member 35 (see FIGS. 7-9), which includes a mounting flange 36 and a downwardly projecting cylindrical portion 37. The cylindrical portion 37 has a diameter which is somewhat less than the width of the ski, and is received in a cylindrical through opening 38 provided in the ski (FIG. 6). For example, in a practical embodiment of the invention, the cylindrical projection may have a diameter of about 1.875 inches, for installation on a ski, the width of which, in the region of the boot binding 31, may be approximately 3.25 inches. The flange 36 has openings 38a to receive fastening screws for securing the base member to the ski 30. Additionally, both the flange 36 and the cylindrical projection 37 may be adhesively bonded to the ski to provide increased overall strength of the assembly. Locating the unit directly behind the boot binding 31 serves to place the braking unit as close as feasible to the skier's weight, and also places it at a location where the ski tends to have the greatest strength.

The cylindrical form of the projection 37, described above, can be advantageous for aftermarket installation of the brake system, because of the relative ease of forming a cylindrical opening in the ski. However, for installations made by original equipment manufacturers (OEM), or where an aftermarket installer has equipment capable of forming non-circular openings in the skis, the projecting portion 37 of the base member 35 may preferably be of rectangular or other non-circular configuration. Where the projecting portion 37 is a rectangular shape, for example, the strength of the ski and brake assembly can be optimized, and the design of component parts of the system is somewhat simplified.

In the illustrated form of the invention, the base member 35 is provided at its forward edge with a pair of spaced apart hinge lugs 39. A motor housing 40 is connected to the hinge lugs 39 by a hinge pin 41, which engages the lugs 39 and also a hinge lug 42 at the forward side of the motor housing. The motor housing is thus mounted on the base member for forward-upward tilting motion, as reflected in FIG. 6.

The motor housing 40, shown in FIGS. 10-13, comprises a bottom wall 43, front and back walls 44, 45 and opposite side walls 46. In the illustrated embodiment, the motor housing is adapted for the reception of a motor 47 of generally square external configuration, and thus the motor housing is formed with a correspondingly configured internal cavity 48 for the reception of such motor.

Figure 17:
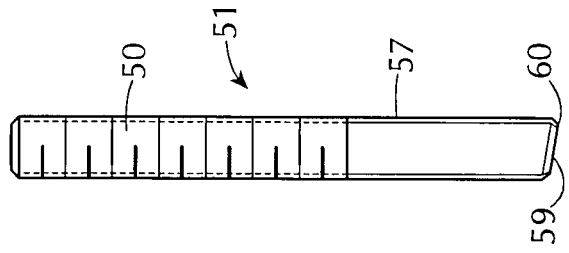
FIG. 17 is a side elevational view of the blade element of FIG. 15.

A particularly advantageous, but non-limiting, example of a motor unit for use in the system of the invention is a DINGS'-Motion hybrid stepper motor linear actuator. Such a motor is available from Chang Zhou DINGS' Electrical & Mechanical Co., Ltd. of Changzhou Jaingsu, China. The selected motor has an internal rotor element 49 of tubular form, which is provided with a threaded insert engaging a threaded rod 50 forming part of a braking element 51 (FIGS. 15-17) to be further described. The stepwise rotation of the rotor sleeve 49 enables the threaded rod 50 to be controllably retracted (raised) or extended (lowered) rapidly and with precision.

As reflected in FIGS. 10-13, a guide member 52 projects downward from the bottom wall 43 of the motor housing. Preferably, the projecting length of the guide member is such that it's flat bottom wall 53 is substantially flush with the bottom of the projection 37 of the base member, and thus with the bottom surface of the ski 30, when the motor housing is in its normal (non-tilted) position, with its bottom wall 43 flush against the top of the base flange 36. Both the flange portion 36 and projecting portion 37 of the base member are provided with a through opening 54 of a size and shape to closely receive the guide member 52, when the motor housing is in its normal position. To accommodate for the upward-forward pivoting action of the motor housing 40, the back surface 55 of the guide member, and the back surface 56 of the through opening 54 are of arcuate form, curved on a radius extending from the axis of the hinge pin 41. Accordingly, the guide member 52 is of a size and shape to fit snugly within the through opening 54, with the arcuate surfaces 55, 56 in close proximity, while at the same time allowing for the pivoting action of the motor housing, as will be further described.

Figure 15:
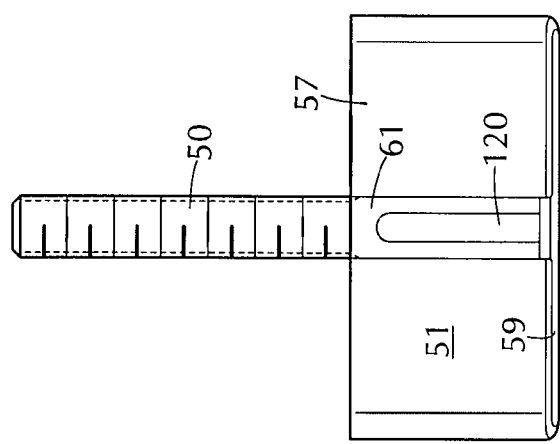
FIG. 15 is a back elevational view of a braking blade element utilized in the ski brake system of the invention.
Figure 16:
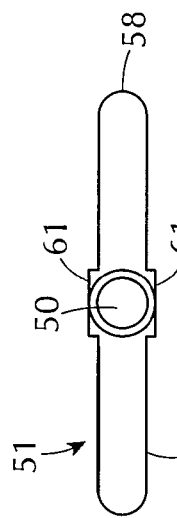
FIG. 16 is a top plan view of the blade element of FIG. 15.

In accordance with an aspect of the invention, the braking system includes a blade-like braking element 51 (FIGS. 15-17) including a transversely elongated blade portion 57, advantageously of rectangular shape as shown in FIG. 15, which is attached to the bottom of the threaded rod 50. The rod 50, as previously mentioned, is engaged by a threaded insert in the tubular rotor 49 and thus is adapted to be raised and lowered by operations of the motor 47. In the illustrated embodiment, the blade 57 is vertically oriented and its side edges 58 are formed in a rounded, semi-circular configuration. The bottom surface 59 of the blade is angled slightly (e.g., 10°), such that the forward edge 60 of the blade lies slightly below the back edge thereof. This forms an edge that can dig into an icy or hard-packed surface for better braking action on such surfaces. If desired, the edge 60 may be serrated to further enhance its braking action on icy surfaces. The center portions of the blade are of slightly increased thickness, forming vertical ribs 61. This enables the diameter of the threaded rod 50 to be somewhat greater than the thickness of the blade, to provide adequate strength. The vertical ribs 61 also cooperate with a corresponding vertical recesses 61a, 61b formed in the front of the guide member 52 and in the rearwardly facing surface of the through opening 54 to provide support against lateral forces applied to the blade 57 during skiing.

Although the motor unit 33 and the braking blade 57 are vertically oriented in the illustrated embodiment of the invention, it will be understood that the blade and motor unit can alternatively be installed to be normally tilted at an angle extending downward and rearward. The alternative arrangement is such that, when the blades are projected below the bottom surfaces of the skis there is a component of force pressing downward on the snow surface.

Figure 10:
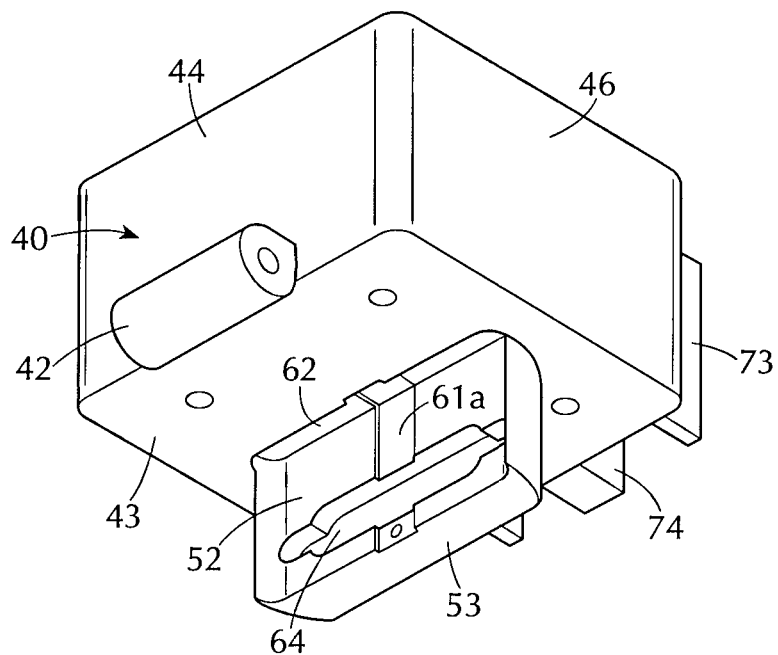
FIG. 10 is in orthographic view, from below and in front, of a motor housing forming part of the ski brake system of the invention.
Figure 11:
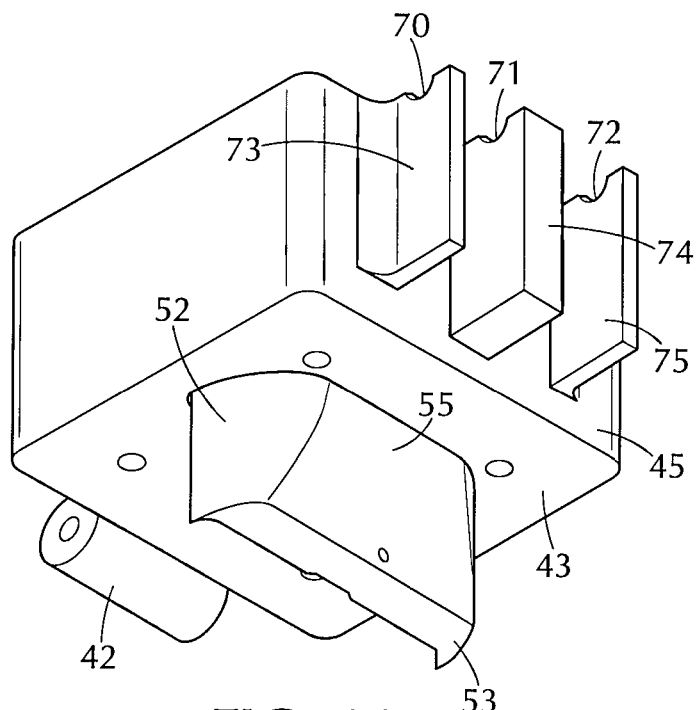
FIG. 11 is an orthographic view, from below and behind, of the motor housing of FIG. 10.

As shown in FIG. 10, the forwardly facing side of the guide member 52 is recessed to a depth to receive approximately ½ the thickness of the blade 57. In addition, the bottom wall 43 of the motor housing is formed with a downwardly opening recess 62 of a cross-section corresponding closely to that of the blade 58, such that the upper portion of the blade can be partly received in the recess 62, when the blade is fully retracted.

Although in the illustrated and preferred form of the invention the braking element 51 is in the form of a flat blade 57, it will be understood by those skilled in the art that other forms of projectable elements may be employed, such as, but not limited to, individual rod-like elements arranged in a lateral array.

Figure 4:
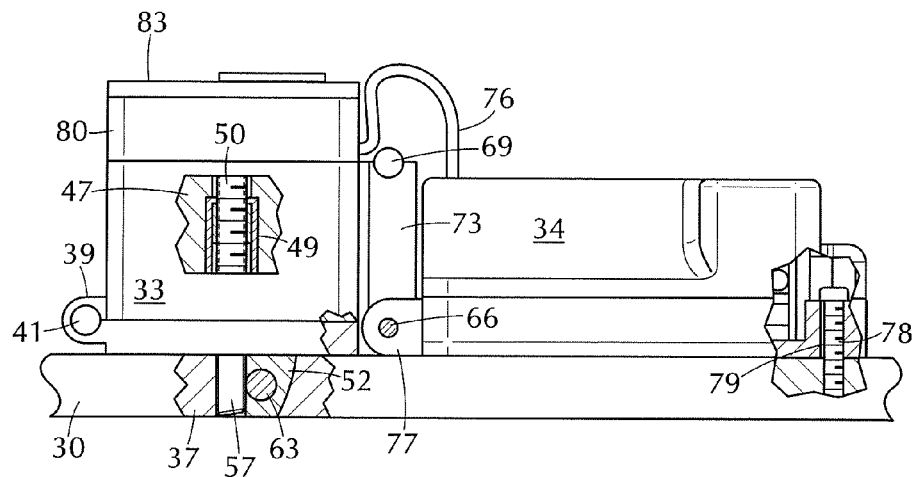
FIG. 4 is a side elevational view, similar to FIG. 3, with parts broken away to illustrate certain details and with the braking element shown in a retracted position.
Figure 5:
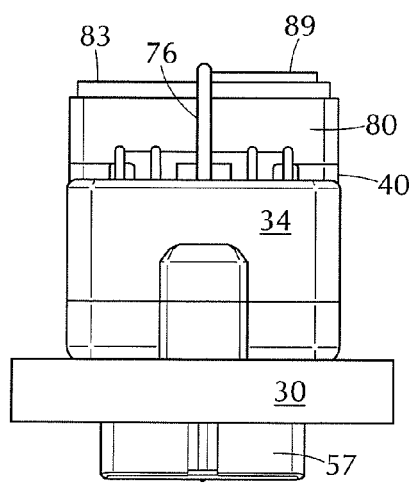
FIG. 5 is a back elevational view of the ski brake system of FIG. 1, with the braking element shown in an extended position.

In its fully retracted position, the blade element 57 is positioned with its lower, forward edge 60 substantially flush with the bottom surface of the ski 30, as shown in FIG. 4. When the blade is fully extended, it projects a distance (e.g., ⅜"-⅝") below the bottom surface of the ski, in order to engage the snow surface and impart resistance to forward movement of the ski. As will be further described, the degree of projection of the blade 57 can be precisely incrementally controlled, in order to give the skier continuous variable control of the resistance in order to respond to differing conditions on the ski slope during a typical ski run.

Figure 14:
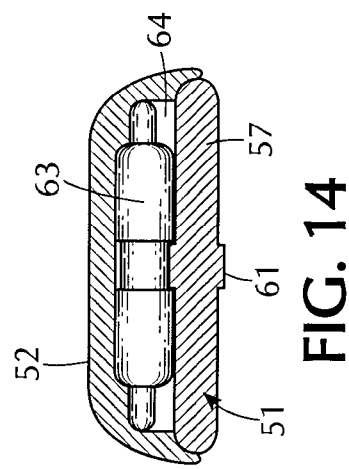
FIG. 14 is a cross-sectional view taken generally on line 14-14 of FIG. 12.

When the blade 57 is extended during skiing, significant rearward pressure is applied to the blade, as will be understood. The blade is supported against such rearward pressure by the rigid guide element 52. Even in a fully projected position of the blade, as reflected in FIG. 6, there is sufficient overlap between the upper portion of the blade and the lower portion of the guide element to provide the necessary support. Because the rearward pressures on the blade during braking can result in substantial friction between the blade and the guide member 52, the system of the invention advantageously includes an anti-friction roller 63 (FIG. 14) which is rotatably received in a recess 64 in the guide member and bears against the back surface of the blade 57 in all operative positions thereof. This facilitates repositioning of the braking blade 57, as desired, during a ski run.

As will be well understood, in the course of a ski run, when the skier has the blade element 57 fully or partially projected below the bottom of the ski, there is potential for the projected blade to engage a rock, tree root or other fixed object. Accordingly, to avoid damage to the braking unit and/or causing the skier to fall, it is an aspect of the invention that the entire motor housing, including the blade 57 and guide member 52, can momentarily be pivoted upward by the forward momentum of the skier, such that the blade can be partially or entirely recessed within the opening 54, as shown in FIG. 6. In this respect, the positioning of the brake element 57 in relation to the arc of curvature of the surface 56 of the through opening 54 in the cylindrical projection 37 is such that, even in a fully projected position, the lower edges of the braking element lie on or inside of (i.e., forwardly of) the arc of curvature. This enables the blade to be momentarily retracted into the through opening 54 when the blade encounters a fixed object.

In the above described alternative embodiment of the invention, in which the motor unit 33 and braking blade 57 are normally disposed at a downward-rearward angle, engagement of a braking blade with a fixed object can be accommodated in part by upward-forward pivoting action of the motor unit and blade and in part by momentary upward displacement of the ski itself. This combination of effects can be advantageous in minimizing sudden forces on the skier that might tend to affect the stability of the skier. In the alternative embodiment, the initial (normal) angle of the blade can be in the range of 30°-45° from the vertical.

Figure 7:
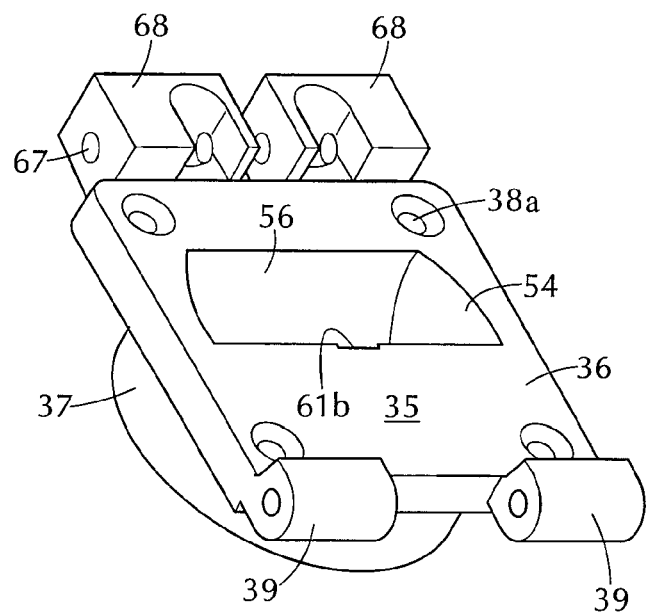
FIG. 7 is an orthographic view, from above, of a base member forming part of the brake system of FIG. 1 and used for mounting the brake mechanism on a ski.

In the illustrated form of the invention, control over the upward tilting of the motor housing is provided by means of a pair of extensible coil springs 65 (see FIG. 6). The lower ends of these springs are secured by means of a threaded pin 66 which is received in openings 67 in anchor lugs 68 extending from the back side of the base flange 36 (FIG. 7). The upper ends of the springs 65 are anchored by a pin 69 which is received in upwardly opening grooves 70-72 formed in ribs 73-75 extending vertically along the back wall 45 of the motor housing. The springs 65 are quite strong, and are preloaded in a manner that the motor housing is held tightly downward against the base flange 36 during normal skiing and braking conditions. However, should the projected blade 57 encounter a fixed object or other extraordinary resistance, the springs 65 will allow momentary upward tilting of the entire motor housing, along with the guide member 52 and blade 57. This allows the braking blade to clear the obstruction, after which the motor housing is returned to its normal position, flat against the base flange 36, and the blade 57 resumes its desired braking action.

Although extensible coil springs 65 are utilized in the described, exemplary embodiment of the invention, it will be understood that other forms of resilient elements may be employed. For example, a suitable torsion spring arrangement, not shown, can be incorporated into the pivot mounting of the motor housing to perform the same function as the springs 65. The use of torsion springs may be preferred in many cases, as providing a neater, cleaner structure, less affected by ice and snow. A further alternative is to secure the motor housing by means of an adjustably releasable detent (not shown), which could be easily set to the skill level of the skier. Upon engagement of a rock or the like, the detent would release the motor housing for upward pivoting movement. The skier would thereafter manually return the motor housing to its operative position, as by pressing downward on the motor housing element with a ski pole.

Power and control is supplied to the motor 47 from the battery box 34, which contains suitable batteries, preferably of a rechargeable type. The battery box also houses appropriate circuitry for controlling the operation of the motor 47 pursuant to the skier's control inputs, as will be further described. A flexible conductor cable 76 connects the batteries and circuitry of the battery box to the motor housing, while allowing the necessary tilting movements of the motor housing.

In the illustrated embodiment, the battery box 34 is provided at its front and with a central connecting lug 77 which is received between the anchor lugs 68 of the base member 35 and is engaged by the spring anchoring pin 66 (see FIG. 4). This arrangement allows some relative pivotal movement between the battery box 34 and the base of the motor housing 40 to accommodate normal flexing of the ski during a ski run. The back portion of the battery box may be secured to the ski by means of a screw 78 (FIG. 4) and/or adhesive means. The screw 78 advantageously is received in an opening 79 which is elongated somewhat in the longitudinal direction of the ski in order to allow for limited sliding motion between the battery box and the ski during flexing movements of the ski. Alternatively, the battery box may be formed integrally with the base member 35 in a manner to accommodate a certain amount of flexing of the integrated structure along with flexing of the ski.

In view of the rather harsh environment to which ski equipment is exposed, often being in the sustained contact with wet snow, melting snow, ice, etc. it is contemplated that the batteries and circuitry may be fully encapsulated in a suitable plastic material. In the illustrated embodiment of the invention, which assumes an aftermarket installation, a housing of plastic material, constituting the encapsulated battery and circuitry, can be mounted on the upper surface of the ski, behind the boot binding, generally in the same position and in the same manner as the battery box 34. However, installations that are made by an original equipment manufacturer of the skis can be integrated directly into the ski structure. Thus, for OEM systems, the fully encapsulated battery and circuitry for the control system can be incorporated into the ski structure, preferably in the region of the boot binding, in a location underneath where the skiers boot will be positioned during skiing.

Is contemplated that the batteries installed in the battery box 34, or encapsulated in a block of plastic material, will readily accommodate a full day's skiing before requiring a recharge. Desirably, the battery containment will include a suitable port (not shown) for a plug-in connection of a recharger for overnight recharging of the batteries. Advantageously, an on-off switch and an associated on-off LED indicator light (not shown) can be associated with the recharging port or otherwise provided on the battery containment.

Figure 18:
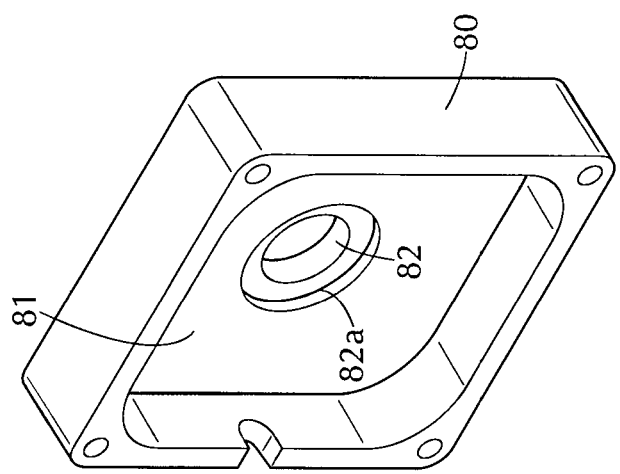
FIG. 18 is an orthographic showing the underside of a cover member used in association with the motor housing of FIG. 10.

Is contemplated that, under certain circumstances, the skier may forget or be unable to recharge batteries between skiing sessions, leaving the skier open to the possibility of losing power on the ski slope with the braking blade 57 in a projected position. To this end, the system of the invention includes a simple arrangement to allow the skier to manually retract the braking blade and continue skiing without the braking facility, as well as to manually extend the braking element in anticipation of a difficult descent. In the illustrated arrangement, the motor housing 40 is provided with a cover 80 (FIG. 18) which is received over the top of the motor housing and secured thereto by suitable screws or other means. The top wall 81 of the cover is provided with a through opening 82 in the center and a recess 82a surrounding the opening on the inside of the cover.

Figure 19:
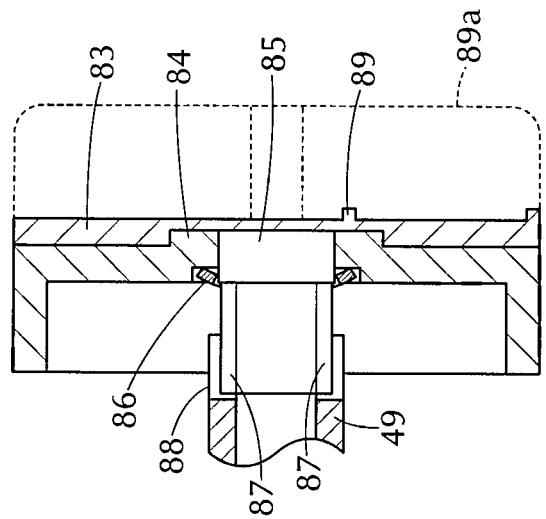
FIG. 19 is a central cross-sectional view showing the cover member of FIG. 18 assembled with a rotatable element for manually operating the braking system, if necessary.

A manipulating disk 83, typically of circular form, is received over a circular boss 84 on the cover for rotation about center of the cover. A shaft 85, which is integral with or fixed to the disk 83, extends through the opening 82 in the cover and is engaged on the underside of the cover by means of a spring washer 86, such that the disc is secured to the cover but can rotate with respect thereto. The lower end of the shaft 85 is formed with axially extending ribs 87 which are received in slots 88 in the upper end of the tubular rotor element 49, as shown in FIG. 19. Near a peripheral edge, the disk 83 is provided with a circular rib 89 by which the disk may be engaged and rotated, enabling manual rotation of the rotor 49, if necessary, to retract the braking blade 57 and enable skiing to continue in the desired manner. The size of the circular rib 89 is large enough to enable the skier to operate the disk without removing his or her ski gloves. Alternatively, the disk 83 may be provided with a plurality of radially disposed ribs, indicated by the reference numeral 89a, to allow the skier to engage and rotate the disk for manual adjustments. Of course, it typically will be necessary for the skier to temporarily stop in order to effect manual adjustments. Nevertheless, the arrangement will enable the skier to proceed safely to the bottom of the hill under all circumstances, even in cases of battery failure or other system malfunction.

Figure 12:
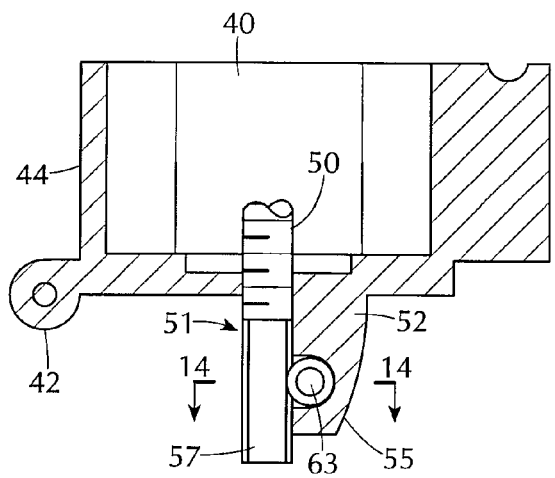
FIG. 12 is a longitudinal cross-sectional view of the motor housing of FIG. 10.
Figure 12A:
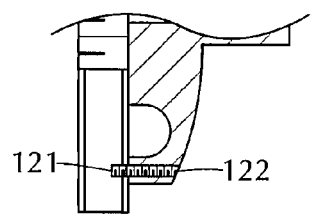
FIG. 12a is an enlarged, fragmentary cross-sectional view of a portion of FIG. 12, showing details thereof.
Figure 13:
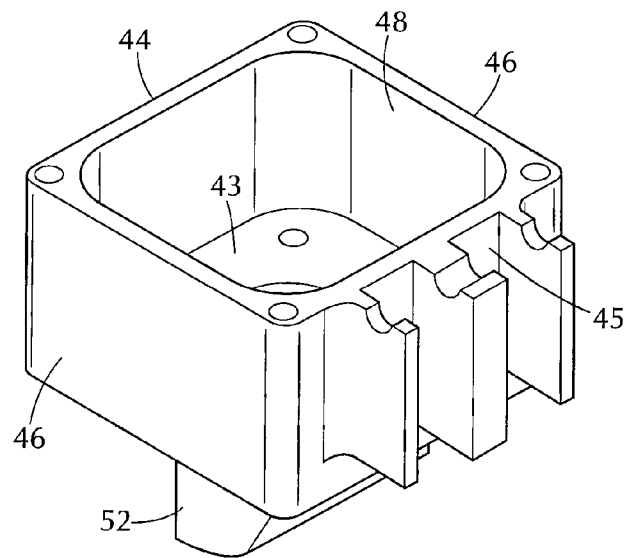
FIG. 13 is an orthographic view, from above and behind, of the motor housing of FIG. 10.

In order to limit downward projection of the braking blade 57 during manual operations thereof, as described above, the back side of the blade 57 is provided with a vertically disposed, U-shaped groove 120 extending from its bottom edge to a point near its upper edge (see FIG. 15). A pin or setscrew 121 is received in a threaded opening 122 provided in the lower extremity of the guide member 52 (FIG. 12a). A projecting end of setscrew 121 is received in the groove 120 to stop downward movement of the blade when the setscrew engages the upper and of the groove. This feature functions only during manual adjustment, of course, as the upper and lower limits of blade movement during normal operations are controlled by position sensor 106, referred to herinafter.

Figure 1:
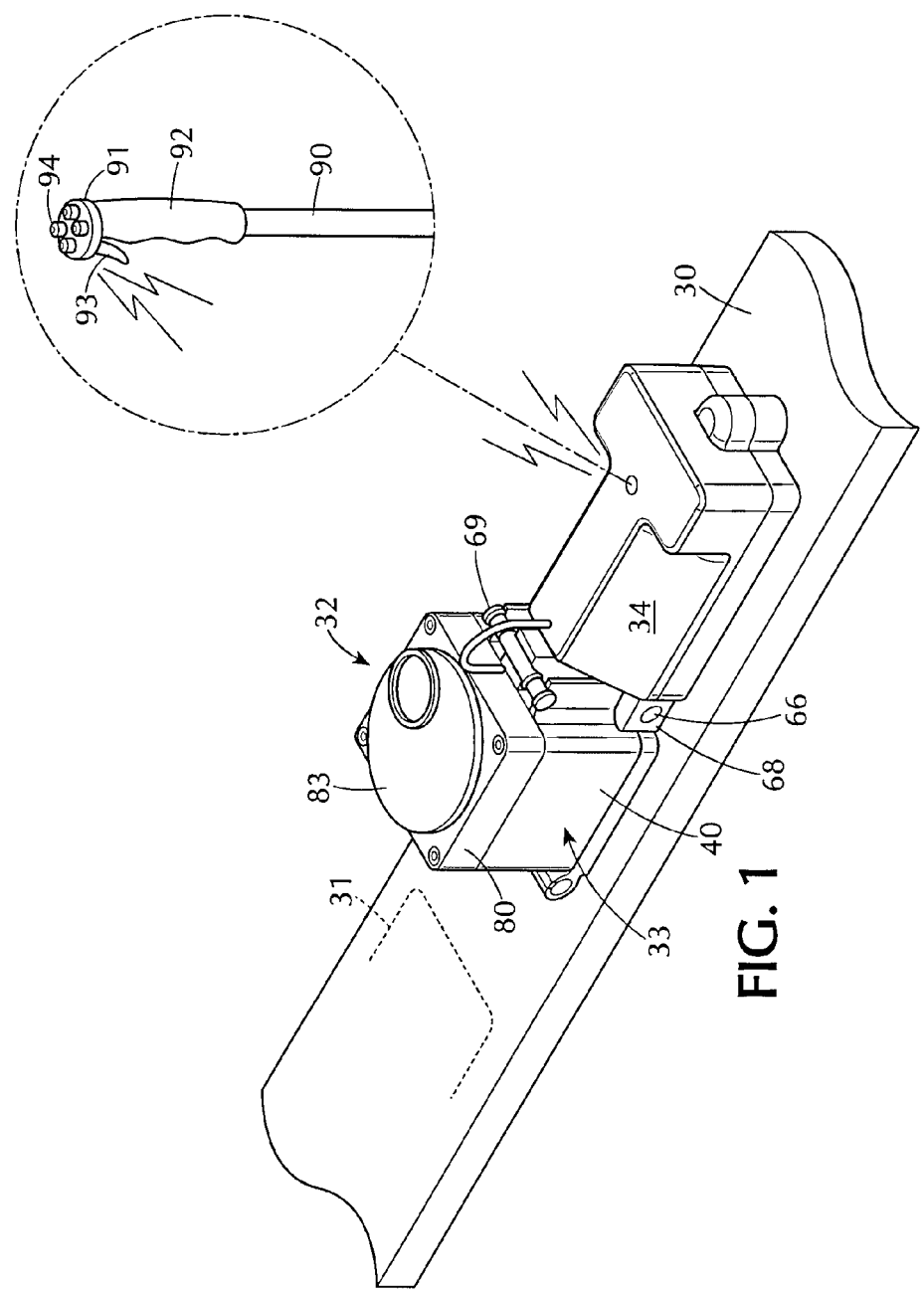
FIG. 1 is a fragmentary orthographic view of a ski incorporating the ski brake system of the invention.

It is intended that control and operation of the brake system on the ski 30 will be carried out wirelessly by the skier, preferably by means of a control module 91 incorporated into one of the ski poles 90 as illustrated in FIG. 1. The control module 91 preferably is built into the handle 92 of the ski pole and is actuated by means of a trigger switch 93, which is positioned to be engaged by the skier during a ski run and enables continuous control to be effected by actuations of the trigger switch. The control module 91 preferably includes a wireless sending unit, the signals from which are received in a wireless receiving unit contained in the battery box 34 (or within a block of encapsulating material as previously described). Thus, as the skier proceeds downhill, when the need for braking action is indicated, the skier simply actuates the trigger switch 93 one or more times to actuate the motor 47 in step fashion, with each trigger actuation resulting in a predetermined number of rotational steps of the motor, causing the threaded rod 50 to be moved incrementally downward to apply the desired braking action. Desirably, the control module 91 includes an array 94 comprising a plurality of LED elements which are illuminated in a progressive manner so that the skier can ascertain visually the amount by which the braking blade 57 is projected below the ski bottom.

In a representative but non-limiting example, it may be convenient to provide an array of six LED indicators. These may include a plurality (e.g., 4) of a first color (e.g., green) and two additional indicators of a different color or colors. The latter would be intended to alert the skier that the braking blades were in or near their fully extended positions.

As heretofore mentioned, is contemplated that the braking features of the invention are not limited to skis and may be incorporated into, for example, snow boards. Although snow boarders typically will not carry ski poles, a hand-held control module can be provided for the snow boarder in, for example, a form similar to the handle portion of a ski pole having the functional features of the described control module 91.

Figure 20:
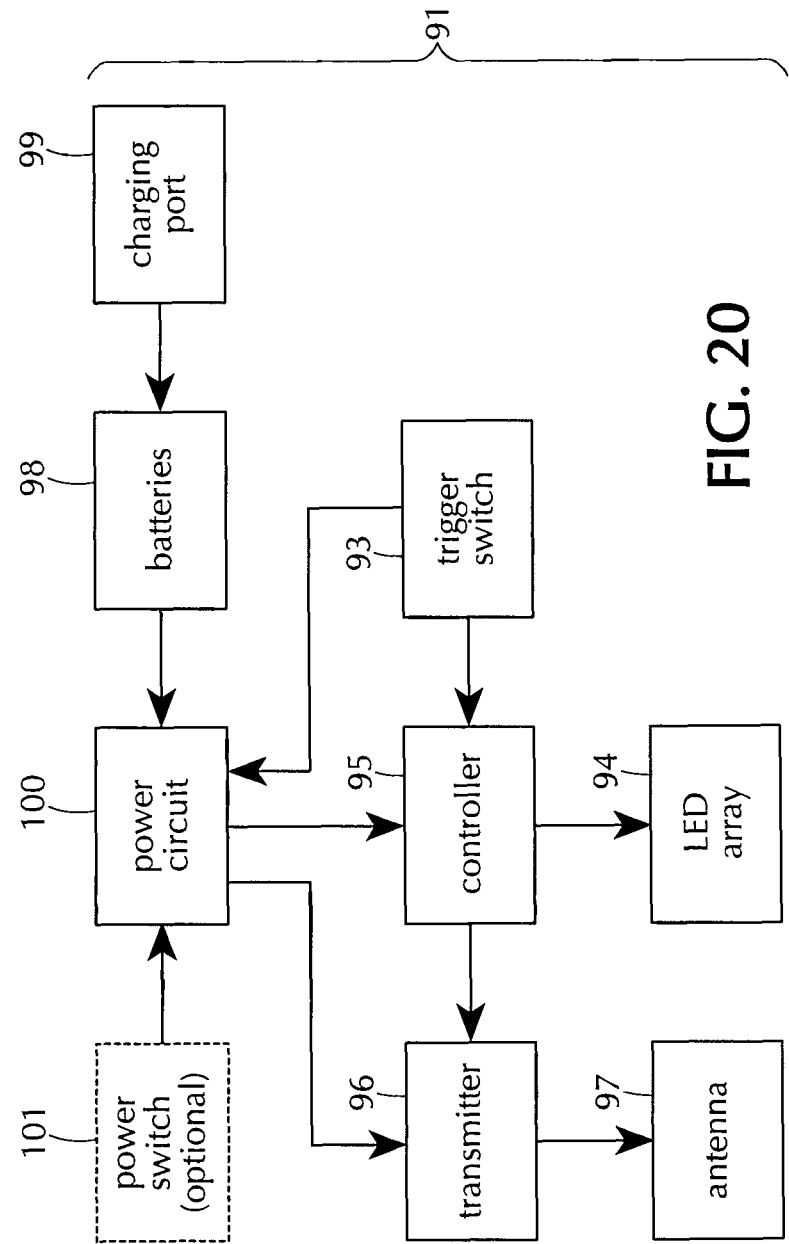
FIG. 20 is a schematic diagram of a control transmitting system incorporated into a ski pole and operable by a skier for actuating the braking system of the invention

FIG. 20 illustrates schematically an advantageous form of the controller 91 utilized in the system of the invention. The trigger switch 93 allows the user to control the level of braking action according various actuating sequences, which may be comprised of, but not limited to, presses of short duration, presses of long duration, double presses occurring with a specified time period, etc. An alternative trigger switch action could also allow the user to control the braking level according to the level of force imparted upon the trigger, although individual trigger actuations are preferable because skier does not have to be concerned about maintaining a constant trigger force during skiing. Particular examples of trigger switches include, but are not limited to, electrical contacts, magnet and reed switches, magnet and hall effect sensors, photoelectric devices, and force transducers.

The trigger switch 93 is electrically connected to a controller 95, which interprets the user's pressing actions upon the trigger switch, to determine the level of braking action desired by the user. Particular examples of controllers include, but are not limited to, microprocessors, microcontrollers, FPGAs (Field Programmable Gate Arrays), ASICs (Application Specific Integrated Circuit) and discrete logic circuits. Such devices can be readily programmed using routine programming procedures known to the skilled artisan. In a preferred system, pressing and holding the trigger switch 93 for a period of, say, 5-6 seconds will activate the controller and make it ready for controlling the ski brakes.

In the illustrated system, the controller 95 generates a signal stream within which braking information is encoded. This braking information can be comprised of a number of braking actions or tasks, such as increasing the braking level, decreasing the braking level, applying full braking, or disabling any braking. It is well within the ability of the skilled artisan to encode braking information in a signal stream. Desirably, the controller 95 is associated with the LED array 94 to provide visual feedback to the user of the operative braking level.

A transmitter 96, electrically connected to the controller 95, transmits the signal stream. Particular examples of transmitters include, but are not limited to, a RF (Radio Frequency) transmitters, IR (Infrared) transmitters, and ultrasound transmitters. An antenna 97 associated with the transmitter 96 radiates the signal stream. Particular examples of antennas include, but are not limited to, RF (Radio Frequency) antennas, LEDs (Light Emitting Diodes), and sound transducers. Advantageously, the antenna 97 can be in the form of a wire element extending downward in the ski pole 90.

Suitable batteries 98, preferably of a rechargeable type, are associated with the transmitter apparatus to provide power. A charging port 99 provides a means for the user to connect a charging cable to recharge the batteries when necessary. The batteries may be housed in upper portions of the ski pole 90, including the handle portion 92. A power circuit 100 regulates the voltage from the batteries for the controller 95 and transmitter 96. This power circuit can comprise circuits such as, but not limited to, linear voltage regulators and switching voltage regulators.

Figure 21:
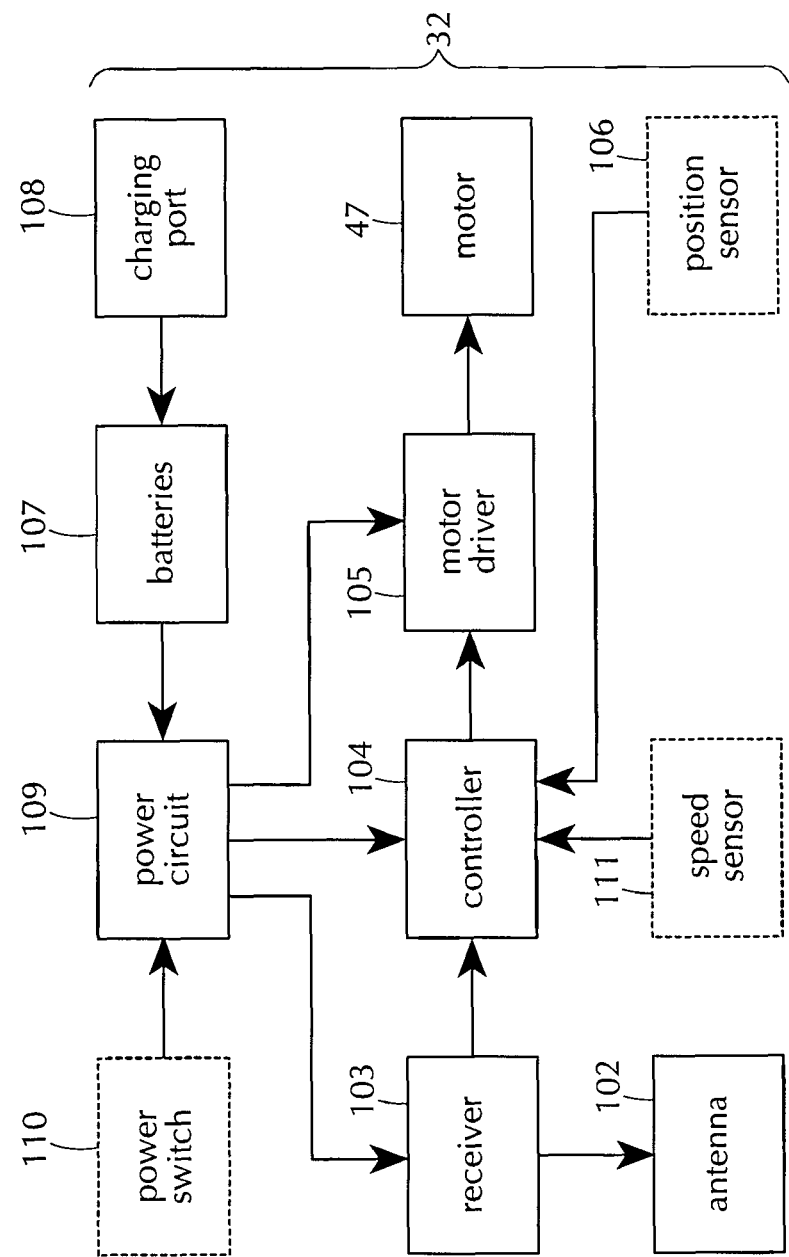
FIG. 21 is a schematic diagram of a control receiving system mounted on the skis for receiving signals from the transmitting system and actuating the braking systems in accordance therewith.

FIG. 21 shows schematically an advantageous form of a ski-mounted brake system 32 for controlling the speed of downhill skiing. Each ski 30 is provided with such a system which, in the illustrated and preferred form of the invention, is controlled by a single controller 91 incorporated into one of the ski poles 90. The controller 91 provides instantaneous, wireless control of the braking system 32 for each ski. Additionally, the wireless control instructions are precisely synchronized in both skis, so that the skier experiences identical braking response on both skis.

A suitable antenna 102 receives the signal transmitted from the transmitter apparatus 91 of FIG. 20. Particular examples of suitable antennas include, but are not limited to, RF (Radio Frequency) antennas, phototransistors, photodiodes, and sound transducers. A receiver 103 receives the signal from the antenna 102 and provides the necessary amplification and discrimination to reproduce the signal stream generated by the transmitting controller 95. A ski-mounted controller 104 receives the signal stream from the receiver 103 and interprets the information encoded therein to determine the desired braking level demanded by the user. Particular examples of a controller include, but are not limited to, microprocessors, microcontrollers, FPGAs (Field Programmable Gate Arrays), ASICs (Application Specific Integrated Circuits) and discrete logic circuits. Such devices can be readily programmed using routine programming procedures known to the skilled artisan.

Upon receipt of control signals from the ski pole-mounted controller 91, each ski-mounted controller 104 instructs an associated motor driver 105 to operate the associated positioning motor 47 in a desired rotational direction for a predetermined number of steps or rotations, or a predetermined time period, in order to achieve the desired braking level. Particular examples of motor drivers include, but are not limited to, transistors, MOSFETs (Metal-Oxide-Semiconductor Field-Effect Transistors), and IGBTs (Insulated Gate Bipolar Transistors). Particular examples of motors include, but are not limited to, stepper motors, such as the previously described DINGS' linear actuator, DC (Direct Current) brush motors, and DC (Direct Current) brushless motors.

An position sensor 106 is associated with the motor 47 to communicate the motor position to the controller 104. The controller can be programmed to stop the motor in an appropriate number of predetermined positions, corresponding to predetermined projections of the blade 57, to achieve various degrees of braking action.

Batteries 107, preferably rechargeable, are associated with the braking system 32 to provide power. A charging port 108 provides a means for the user to connect a charging cable (not shown) to recharge the batteries as necessary. A power circuit 109 regulates the voltage from the batteries for the receiver 103, controller 104, and motor driver 105. This power circuit can comprise circuits such as, but not limited to, linear voltage regulators and switching voltage regulators.

If desired, a ski boot-activated power switch 110 can be associated with the power circuit 109 to automatically activate the electronic system upon the insertion of the user's boot into the boot binding 31 of the ski. Particular examples of such power switches include, but are not limited to, electrical contacts, magnet and reed switches, magnet and hall effect sensors, photoelectric devices, and force transducers. The boot-activated power switch 110 can be associated with either the boot itself or the boot binding mechanism. When the user removes the boot from the binding the system will be automatically powered off.

An optional speed sensor 111 can be used to communicate the speed of the ski to the controller 104 to allow the controller to automatically modulate the braking level to achieve desired speed levels or to prevent excessive speeds during the course of a downhill run. Particular examples of suitable speed sensors include, but are not limited to, electrical contacts, magnet and reed switches, magnet and hall effect sensors, photoelectric devices, and DC (Direct Current) brush motors. The described modulation can be readily implemented using routine closed loop control procedures known to the skilled artisan, much like a typical cruise control of an automobile.

The system of the invention is particularly advantageous in that it can be easily incorporated into the ski at the ski shop, using simple, readily available tools. In this respect, skis typically are provided to the sellers in a plain form, without boot bindings or other features. These accessories typically are installed by the seller, after being chosen by the purchaser. Nevertheless, the system of the invention can advantageously be included as an OEM installation, in which case the batteries and circuitry that otherwise would be mounted on the surface of the ski can be encapsulated and incorporated directly into the ski structure, preferably in a position to underlie the skiers boots when secured by the boot bindings.

The new system is functionally superior to known systems, in that it is contained wholly within the width of the ski and the braking blades are located as close as practicable to the feet of the skier. Several important advantages are derived from this arrangement. Among other things, the braking element, being close to the feet of the skier, is maintained in a desired contact with the skiing surface for optimum braking effect. The optimized braking effect is realized in part because the weight of the skier on the ski, directly ahead of the braking element, serves to pack the snow surface somewhat to present greater resistance to the projected blade. Additionally, because the blade is close to the skier's center of weight on the skis, maximum downward pressure is applied to the blade to maximize the depth of contact of the blades with the underlying snow surface. This central location on the ski also is a region of maximum strength of the ski, such that the ski can accommodate the presence of the braking system without unduly weakening the structure of the ski.

Importantly, location of the braking mechanisms near the feet of the skier, in conjunction with configuration of the braking element as a transversely disposed, relatively thin blade-like element, facilitates the skier's ability to slip the skis sideways during turns and for stopping while the blades are projected downward from the ski bottoms for braking action. This allows the skier to maintain optimum control over the orientation of the skis while utilizing the braking system for speed control. The last mentioned feature is significant in that it enables and encourages the skier to utilize the braking feature preemptively throughout a ski run such that the skier may in effect "downshift" when approaching difficult areas of a ski slope without concern that the braking elements will interfere with the ability to control the skis in an otherwise normal manner. The new system, providing instantaneous, synchronized and precisely controlled braking action, makes it easy and convenient for the skier to utilize the braking feature continuously during a ski run while maintaining otherwise substantially normal skiing techniques.

The braking system of the invention is also unique in providing for substantially instantaneous and momentary release in the event that a projected braking element encounters a rock, tree root or other fixed object. The hinged and resiliently seated motor housing, carrying the projectable braking element, enables the braking element to be momentarily retracted by the forward momentum of the skis and skier. The upward pivoting motion of the motor housing and braking element enables it to clear the object and allow the skis to pass over without a sharp deceleration of the skis or other action that might damage the equipment or cause the skier to fall. Where the motor unit and braking blade are initially disposed at a downward-rearward angle, an optimum balance can be provided between upward pivoting of the blade, and upward displacement of the ski, when a rock or other fixed object is encountered. This enables the skis to pass over the fixed object with minimum effect upon the momentum and balance of skier.

The new braking system also enables the skier to "walk" the skis up an incline without having to remove the skis or resorting to slow and awkward procedures such as "herringbone" walking and/or sidestepping and/or pushing strongly backward on the ski poles. The new system enables the skier to project the "braking" blades below the bottom surfaces of the skis, so that the blade digs into the snow surface to prevent or significantly minimize backsliding of the skis when the skis are pointed uphill. Walking uphill, on a reasonable incline, is as simple as elevating the back of one ski and sliding it forward while maintaining weight on the opposite ski. The arrangement significantly minimizes the time and energy involved in walking up an incline.

It should be understood, of course, that the specific forms of the invention herein illustrated and described are intended to be representative only, as many changes may be made therein without departing from the clear teachings of the disclosure. Accordingly, reference should be made to the following appended claims in determining the full scope of the invention.

What is claimed is:

1. A ski brake for mounting on a ski, where the ski comprises a generally flat, elongated member having a bottom surface slidable over snow, a top surface, and opposite side edges, said ski brake comprising a base member mountable on the ski and having a first, downwardly projecting portion of a size and shape to be received in a recess in the ski, said base member further having a second portion arranged to be secured to and supported by the top surface of the ski, a motor housing pivotally connect at a forward side thereof to a forward side of said base member for pivoting movement about a transverse pivot axis with respect to said base member, said motor housing having a downwardly projecting guide member, said base member having a through opening therein of a size and shape to receive said downwardly projecting guide member, said downwardly projecting guide member having a transversely elongated and downwardly disposed guide recess therein open at a bottom of said guide member, a snow-engaging braking element received within said downwardly disposed recess for guided upward-downward movement therein, a battery-operated, position-controllable motor mounted in said motor housing and engaged with said braking element for controllably moving said braking element between a fully retracted position, in which a lower end of said braking element is positioned to be substantially flush with the bottom surface of said ski, and a fully extended position in which said braking element is projected a predetermined distance below said bottom surface, and one or more resilient elements tending to retain said motor housing in a predetermined operational position, enabling said braking element to be projected below the bottom surface of said ski, said one or more resilient elements accommodating upward pivoting movement of said motor housing and upward and rearward pivoting movement of said braking element, when said braking element is projected below the bottom surface of said ski, in response to engagement of the braking element with a fixed object or other condition creating excessive resistance to forward movement of said braking element.

2. A ski brake according to claim 1, wherein the transverse pivot axis of said motor housing is positioned to be spaced adjacent to and above the top surface of the ski and forward of said braking element.

3. A ski brake according to claim 1, wherein said braking element is a generally flat, blade element having a width greater than a thickness thereof and oriented transversely with respect to said base member.

4. A ski brake according to claim 1, wherein said downwardly projecting portion of said base member is of circular form and of a length such that a bottom surface of said guide member is substantially flush with the bottom surface of the ski when said base member is assembled with the ski, and the lower end of said braking element, when said braking element is in said fully retracted position, is substantially flush with the bottom surface of said ski.

5. A ski brake according to claim 1, wherein
said base member is formed with a flange adapted to be seated on the top surface of said ski, and
a length of said downwardly projecting portion is substantially equal to a thickness of the ski and extends from said flange to the bottom surface of said ski.

6. A ski brake according to claim 1, wherein
said downwardly projecting guide member has a rearwardly facing arcuate surface with a center of curvature at said transverse axis,
said through opening has a forwardly facing arcuate surface with a center of curvature at said transverse axis,
said respective arcuate surfaces being directly opposed and closely spaced when said motor housing is seated in a normal operating position on said base member, and
said downwardly projecting guide member has a generally flat bottom surface which is substantially flush with a bottom surface of said downwardly projecting portion of said base member when said motor housing is seated in said normal operating position.

7. A ski brake according to claim 6, wherein
said braking element is so positioned with respect to said transverse axis that a lower back extremity of said braking element, in a fully extended position thereof, lies on or within a radius of the forwardly facing arcuate surface of the downwardly projecting portion of said base member, whereby an extended braking element may be tilted upward to a position substantially flush with the bottom surface of said ski.

8. A ski brake according to claim 1, wherein
a support roller is received in a forwardly facing recess in said downwardly projecting guide member, and
an exposed forward surface portion of said support roller engages and supports a back surface portion of said braking element.

9. A ski brake according to claim 1, wherein
a power and control unit for said motor is pivotally attached at a front thereof to a rearward side of said base member and extends rearwardly therefrom, and
a fastening element and/or adhesive secures a back of said power and control unit to said ski.

10. A ski brake according to claim 1, wherein
a manually operable member is mounted on a top of said motor housing and connected through said top to said motor for manually actuating the braking element.

11. A ski brake according to claim 1, wherein
said one or more resilient elements comprise tension spring elements connected at one end thereof to said base member and at a second end thereof to said motor housing.

12. A ski brake according to claim 11, wherein
a power and control unit for said motor is pivotally attached at a front thereof to a rearward side of said base member and extends rearwardly therefrom,
a pivot pin extends transversely through back portions of said base member and forward portions of said power and control unit, and
said pivot pin secures the lower ends of said one or more tension springs.

13. A snow brake for a recreational device that slides over a snow surface, where the recreational device comprises a generally flat, elongated element having a bottom surface slidable over a snow surface, a top surface, and opposite side edges, said snow brake comprising
a base member having a portion of a size and shape to be received in a recess in said recreational device, between the side edges thereof,
said base member portion having a downwardly extending opening therein opening at a bottom thereof,
a snow-engaging braking element received in said opening in said base member portion,
a motor unit mounted on said base member and connected to said braking element for effecting controllable projection of said braking element in said opening to positions below the bottom surface of said recreational device, and
a resilient pivot mounting for said braking element to enable temporary upward and rearward pivoting movement of said braking element in response to engagement thereof by a fixed object or other excessive resistance to forward movement of said braking element.

14. A snow brake according to claim 13, wherein
said braking element is a blade element having a width greater than a thickness thereof and oriented transversely with respect to said base member.

15. A snow brake according to claim 14, wherein
said blade element is vertically oriented and mounted for controlled vertical projection.

16. A snow brake according to claim 13, wherein
said motor unit is pivotally mounted on said base member for pivotal movement about a pivot axis transverse to a longitudinal axis of said recreational device and positioned at a forward side of said motor unit and at a level closely adjacent to the top surface of said recreational device, and
said braking element is mounted by said motor unit for pivotal movement therewith about said pivot axis.

17. A snow brake according to claim 16, wherein
said motor unit includes a downwardly projecting guide member positioned to extend through said base member portion for guiding and supporting said braking element and having a forwardly facing support surface supporting at least a rearwardly facing side of said braking element, and
said opening in said base member portion is of a size and shape to accommodate pivoting movement of said guide member about said pivot axis.

18. A snow brake according to claim 17, wherein
said guide member has a rearwardly facing arcuate surface with a center of curvature about said pivot axis,
the downwardly extending opening in said base member portion has a forwardly facing arcuate surface with a center of curvature about said pivot axis, and
said respective arcuate surfaces are directly opposed and closely spaced when said motor unit is seated in a normal operating position on said base member.

19. A snow brake according to claim 18, wherein
said braking element is so positioned with respect to said pivot axis that a lower back extremity of said braking element, in a fully extended position thereof, lies on or within a radius of the forwardly facing arcuate surface of said base member portion, whereby an extended braking element may be tilted upward to a position flush with the bottom surface of said recreational device.

20. A snow brake according to claim 17, wherein
said guide member is formed with a transversely elongated recess in the forwardly facing surface thereof, and
a support roller is rotatably received in said recess and has a forwardly exposed surface portion thereof engaging a back surface of said braking element.

21. A snow brake according to claim 13, wherein
said motor unit comprises a linear actuator having a step-controlled tubular rotor with an internally threaded portion, and said braking element includes an upwardly extending threaded rod engaging said internally threaded portion and operable upon controlled rotation of said rotor to raise and lower said braking element.

22. A snow brake according to claim 13, wherein wherein the recreational device comprises a pair of skis, and a power and control unit for said motor unit is associated with each ski.

23. A snow brake according to claim 13, wherein portions of said motor unit are connected by one or more spring elements to portions of said base member to urge said motor unit to pivot into a normal position seated on said base member while accommodating upward pivoting of said motor unit when said braking element, while partially or fully extended, encounters excessive resistance to forward movement.

24. A snow brake according to claim 13, wherein said base member has a flange portion arranged to be secured to and supported by the top surface of the recreational device.

25. A snow brake for a recreational device that slides over a snow surface, where the recreational device comprises a generally flat, elongated element having a bottom surface slidable over a snow surface, a top surface, front and back ends and opposite side edges, said snow brake comprising, a base member suitable to be supported by said recreational device, a motor unit mounted on said base member, a snow-engaging braking member associated with said motor unit and movable by said motor unit into positions projected from the bottom surface of said recreational device or retracted to a position at or above said bottom surface, said braking member being positioned between the side edges of and substantially forward of the back end of said recreational device, a user-operated control for controllably operating said motor unit to extend and retract said braking member relative to said bottom surface, said braking member being mounted for upward pivoting movement with respect to said recreational device about an axis transverse to a longitudinal axis of said recreational device, one or more resilient retention elements normally retaining said braking member in a first orientation, in which said braking member can be projected below the bottom surface of said recreational device, said one or more resilient retention elements being operative to accommodate upward tilting of said braking member away from said first orientation, in response to engagement of said braking member by a fixed object or to other excessive resistance to forward movement of said braking member.

26. A snow brake according to claim 25, wherein said braking member comprises a single, blade element of greater width than thickness disposed transversely to said longitudinal axis.

27. A snow brake according to claim 25, wherein said braking member is connected to said motor unit for movement on an axis fixed with respect to an axis of said motor unit, said motor unit is mounted on said base member for upward pivoting movement about an axis transverse to said longitudinal axis and on a forward side of said motor unit, said one or more resilient retention elements comprise one or more springs connecting said motor unit to said base member to urge said motor unit into a normally fixed operating position, and said one or more springs are resiliently displaceable in accordance with tilting movements of said motor unit to urge said motor unit back to its normally fixed operating position.

\* \* \* \* \*